United States Patent
Huang

(10) Patent No.: US 7,029,247 B2
(45) Date of Patent: Apr. 18, 2006

(54) HEAT-DISSIPATING FAN DEVICE WITH LIGHT-EMITTING CAPABILITY

(76) Inventor: Jui-Yi Huang, No. 175, Xin-Yi Rd., Dabi, Yulin (TW)

( * ) Notice: Subject to any disclaimer, the term of this patent is extended or adjusted under 35 U.S.C. 154(b) by 406 days.

(21) Appl. No.: 10/632,814

(22) Filed: Aug. 4, 2003

(65) Prior Publication Data

US 2005/0031464 A1 Feb. 10, 2005

(51) Int. Cl.
  *F04B 17/00* (2006.01)
(52) U.S. Cl. .............. 417/423.1; 417/63; 361/688; 361/695
(58) Field of Classification Search ............ 417/63, 417/423.1; 361/688, 695
  See application file for complete search history.

(56) References Cited

U.S. PATENT DOCUMENTS 5,666,011 A * 9/1997 Hong .................. 310/40.5
6,137,197 A * 10/2000 Taniguchi et al. ........ 310/67 R
6,290,471 B1 * 9/2001 Horng ..................... 417/354

* cited by examiner

Primary Examiner—Charles G. Freay
Assistant Examiner—Ryan Gillan
(74) Attorney, Agent, or Firm—Harness, Dickey & Pierce, P.L.C.

(57) ABSTRACT

In a heat-dissipating fan device, a fan impeller has a spindle mounted rotatably in a fan housing. A first magnetic ring member is disposed around a first stator coil mounted securely in the housing, and is coupled co-rotatably to the fan impeller such that a magnetic field induced by an external electrical current supplied to the first stator coil results in rotation of the fan impeller with the first magnetic ring member. Multiple light emitting elements are mounted on and are connected electrically to a circuit board mounted co-rotatably to the fan impeller. A second magnetic ring member is mounted securely in the fan housing, and is disposed around a second stator coil mounted on and electrically coupled to the circuit board and disposed around the spindle such that rotation of the second stator coil with the fan impeller results in an induced electrical current in the second stator coil.

5 Claims, 3 Drawing Sheets

HEAT-DISSIPATING FAN DEVICE WITH LIGHT-EMITTING CAPABILITY

BACKGROUND OF THE INVENTION

1. Field of the Invention

The invention relates to a heat-dissipating fan device, more particularly to a heat-dissipating fan device with a light-emitting capability.

2. Description of the Related Art

A conventional heat-dissipating fan device with a light-emitting capability includes a fan housing, a fan impeller mounted rotatably in the fan housing, and a plurality of light emitting elements disposed fixedly in the fan housing. An external power source supplies power to drive rotation of the fan impeller and to actuate the light emitting elements. The conventional heat-dissipating fan device with the aforesaid construction can provide a static light-emitting effect.

SUMMARY OF THE INVENTION

The object of the present invention is to provide a heat-dissipating fan device that has a dynamic light-emitting effect.

According to the present invention, a heat-dissipating fan device comprises:

a fan housing having a base wall, and a surrounding wall that extends from the base wall, the base wall being formed with a bearing seat extending in an axial direction transverse to the base wall;

a first stator coil mounted securely around the bearing seat;

a fan impeller including a fan cap that has an outer cap surface formed with a plurality of radial fan blades, and a spindle disposed in the fan cap, extending in the axial direction and mounted rotatably on the bearing seat;

a first magnetic ring member disposed around the first stator coil and coupled co-rotatably to the fan cap such that a magnetic field induced by an external electrical current supplied to the first stator coil results in rotation of the fan impeller with the first magnetic ring member;

a circuit board disposed in the fan cap and mounted co-rotatably to the fan impeller;

a plurality of light emitting elements mounted on and connected electrically to the circuit board;

a second stator coil mounted on and electrically coupled to the circuit board and disposed around the spindle; and a second magnetic ring member mounted securely in the fan housing and disposed around the second stator coil such that rotation of the second stator coil with the fan impeller results in an induced electrical current in the second stator coil that is to be supplied to the light emitting elements.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
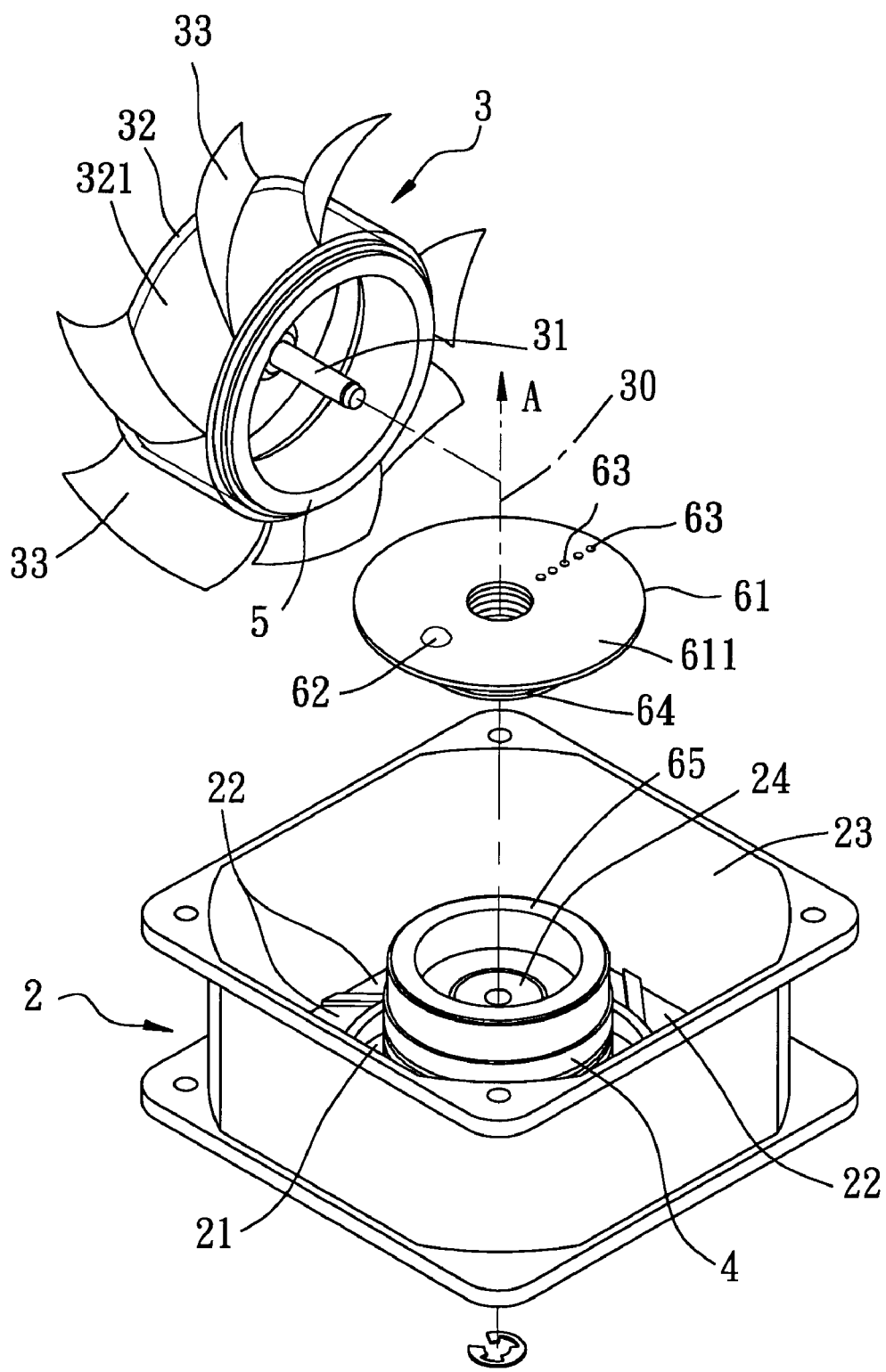
FIG. 1 is an exploded perspective view showing the first preferred embodiment of a heat-dissipating fan device according to the present invention.

Before the present invention is described in greater detail, it should be noted that like elements are denoted by the same reference numerals throughout the disclosure.

Figure 2:
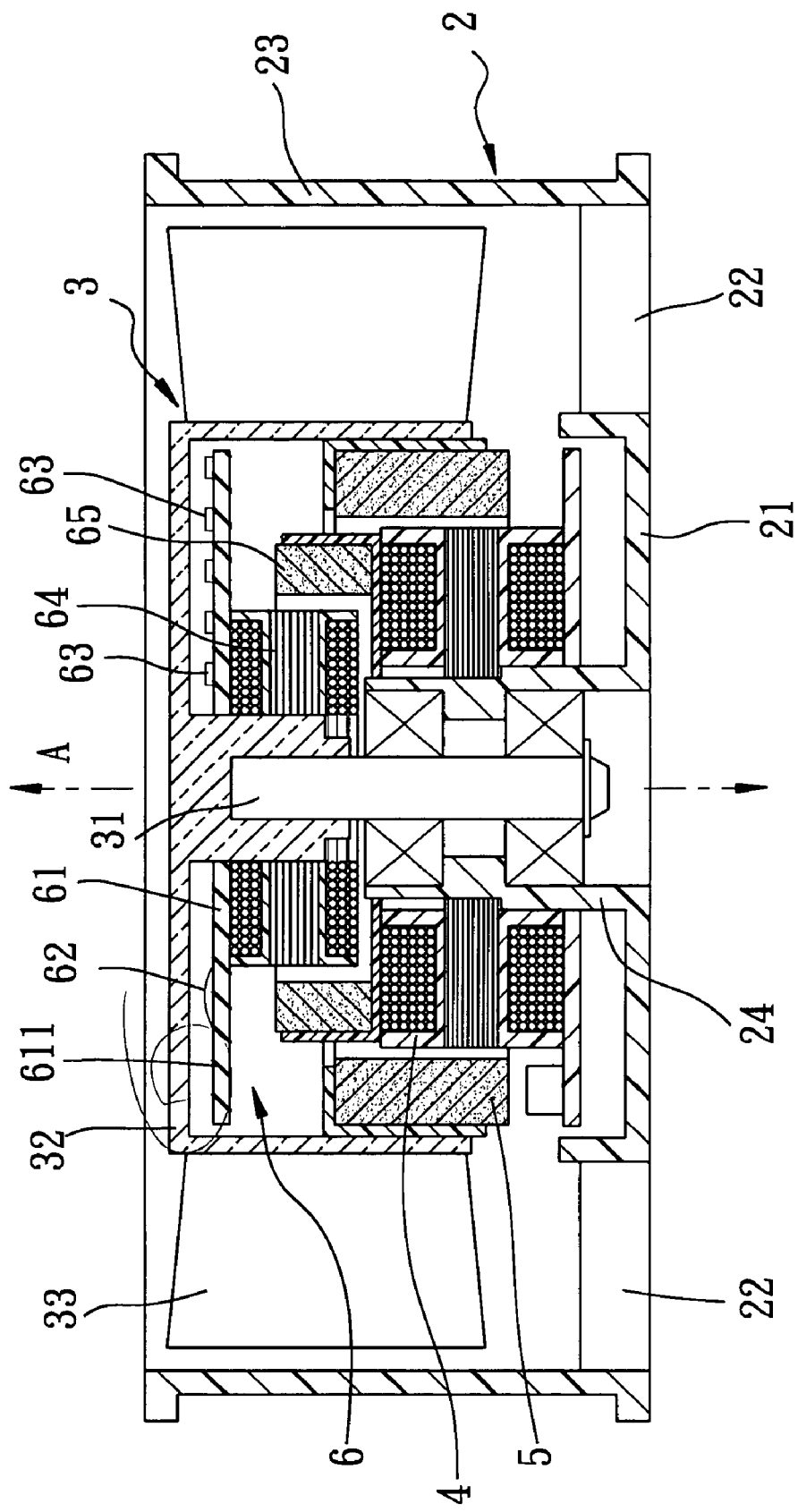
FIG. 2 is a schematic sectional view of the first preferred embodiment.

Referring to FIGS. 1 and 2, the first preferred embodiment of a heat-dissipating fan device according to the present invention is shown to include a fan housing 2, a first stator coil 4, a fan impeller 3, a first magnetic ring member 5, a circuit board 61, a plurality of light emitting elements 63, a second stator coil 64, and a second magnetic ring member 65.

The fan housing 2 has a base wall 21, and a surrounding wall 23 that extends from the base wall 21. The base wall 21 is formed with a plurality of vent holes 22, and a bearing seat 24 extending in an axial direction (A) transverse to the base wall 21.

The first stator coil 4 is mounted securely around the bearing seat 24, and is adapted to be coupled electrically to an external power source via a power wire (not shown).

The fan impeller 3 includes a fan cap 32 that has an outer cap surface 321 formed with a plurality of radial fan blades 33, and a spindle 31 disposed in the fan cap 32, extending in the axial direction (A) and mounted rotatably on the bearing seat 24. In this embodiment, the fan cap 32 and the fan blades 33 are made of a transparent material.

The first magnetic ring member 5 is disposed around the first stator coil 4 and is coupled co-rotatably to the fan cap 32 such that a magnetic field induced by an external electrical current supplied to the first stator coil 4 by the external power source results in rotation of the fan impeller 3 with the first magnetic ring member 5.

The circuit board 61 is disposed in the fan cap 32 and is mounted co-rotatably to the fan impeller 3. In this embodiment, the circuit board 61 has a surface 611 disposed distal to the base wall 21 of the fan housing 2 and disposed to confront the fan cap 32. The surface 611 has a control chip 62 mounted thereon.

The light emitting elements 63, such as light emitting diodes, are mounted on the surface 611 of the circuit board 61 and are coupled electrically to the circuit board 61. In this embodiment, the light emitting elements 63 are arranged in a radial direction with respect to the spindle 31.

The second stator coil 64 is mounted on and is coupled electrically to the circuit board 61, and is disposed around the spindle 61.

The second magnetic ring member 65 is mounted securely in the fan housing 3 and is disposed around the second stator coil 64 such that rotation of the second stator coil 64 with the fan impeller 3 results in an induced electrical current in the second stator coil 64 that is to be supplied to the control chip 62 and the light emitting elements 63. As such, the control chip 62, such as an integrated circuit, can be configured to control blinking and actuating states of the light emitting elements 63.

To sum up, due to the presence of the transparent fan cap 32, light emitted by the light emitting elements 63 can pass through the fan cap 32. Moreover, the light emitting elements 63 mounted on the circuit board 61 rotate with the fan impeller 3 such that a dynamic light-emitting effect can be obtained.

Figure 3:
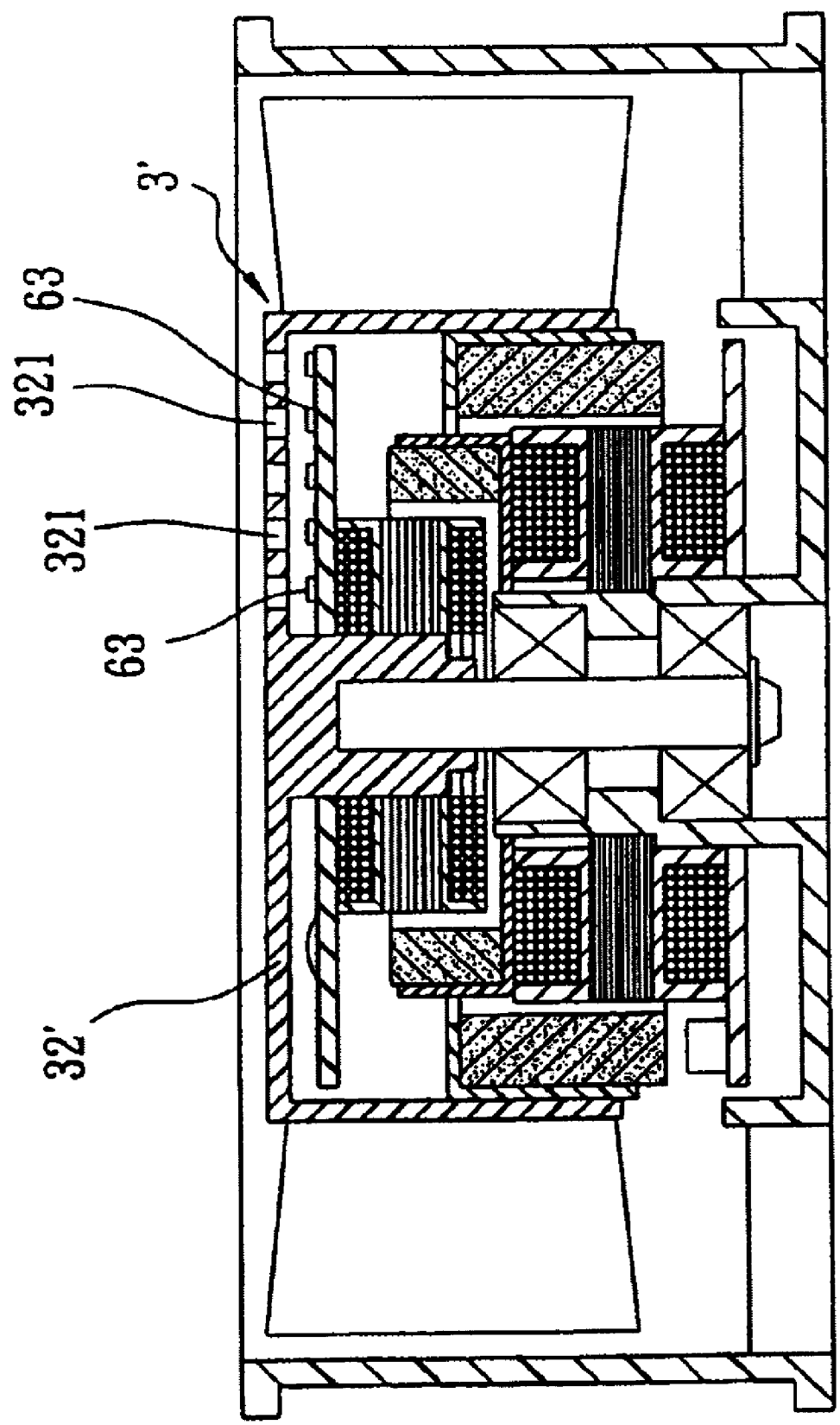
FIG. 3 is a schematic sectional view showing the second preferred embodiment of a heat-dissipating fan device according to the present invention.

FIG. 3 illustrates the second preferred embodiment of a heat-dissipating fan device according to this invention, which is a modification of the first preferred embodiment. Unlike the embodiment of FIG. 2, the fan cap 32' of the fan impeller 3' is made of a non-transparent material but is formed with a plurality of through holes 321 corresponding to the light emitting elements 63 so as to enable light emitted by the light emitting elements 63 to pass therethrough.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A heat-dissipating fan device comprising:
   a fan housing having a base wall, and a surrounding wall that extends from said base wall, said base wall being formed with a bearing seat extending in an axial direction transverse to said base wall;
   a first stator coil mounted securely around said bearing seat;
   a fan impeller including a fan cap that has an outer cap surface formed with a plurality of radial fan blades, and a spindle disposed in said fan cap, extending in the axial direction and mounted rotatably on said bearing seat;
   a first magnetic ring member disposed around said first stator coil and coupled co-rotatably to said fan cap such that a magnetic field induced by an external electrical current supplied to said first stator coil results in rotation of said fan impeller with said first magnetic ring member;
   a circuit board disposed in said fan cap and mounted co-rotatably to said fan impeller;
   a plurality of light emitting elements mounted on and connected electrically to said circuit board;
   a second stator coil mounted on and electrically coupled to said circuit board and disposed around said spindle; and
   a second magnetic ring member mounted securely in said fan housing and disposed around said second stator coil such that rotation of said second stator coil with said fan impeller results in an induced electrical current in said second stator coil that is to be supplied to said light emitting elements.

2. The heat-dissipating fan device as claimed in claim 1, wherein said circuit board has a surface disposed distal to said base wall of said fan housing, disposed to confront said fan cap, and mounted with said light emitting elements.

3. The heat-dissipating fan device as claimed in claim 2, wherein said light emitting elements are arranged in a radial direction with respect to said spindle.

4. The heat-dissipating fan device as claimed in claim 1, wherein said fan cap is made of a transparent material.

5. The heat-dissipating fan device as claimed in claim 2, wherein said fan cap is formed with a plurality of through holes corresponding to said light emitting elements.

* * * * *